US008958172B1

(12) United States Patent  (10) Patent No.: US 8,958,172 B1
Hansen (45) Date of Patent: Feb. 17, 2015

(54) MULTIPLE DISK STACK, SINGLE ACTUATOR HARD DISK DRIVE

(71) Applicant: HGST Netherlands B.V., Amsterdam (NL)

(72) Inventor: Ulrich Georg Hansen, Los Gatos, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/056,846

(22) Filed: Oct. 17, 2013

(51) Int. Cl.
*G11B 17/038* (2006.01)
(52) U.S. Cl.
USPC ........................................................ 360/98.01
(58) Field of Classification Search
USPC ........................................................ 360/98.01
See application file for complete search history.

(56) References Cited

U.S. PATENT DOCUMENTS

| | | | | |
|---|---|---|---|---|
| 3,864,747 | A | * | 2/1975 | Pejcha .......................... 360/99.18 |
| 4,019,205 | A | | 4/1977 | Salmond et al. |
| 4,566,087 | A | | 1/1986 | Kraft |
| 5,343,345 | A | * | 8/1994 | Gilovich ...................... 360/264.7 |
| 5,415,471 | A | | 5/1995 | Dalziel |
| 5,449,091 | A | | 9/1995 | Dalziel |
| 5,777,957 | A | | 7/1998 | Lyman |
| 6,005,831 | A | | 12/1999 | Park |
| 6,115,215 | A | * | 9/2000 | Adams et al. ................. 360/264.4 |
| 6,208,489 | B1 | * | 3/2001 | Marchon ...................... 360/294.7 |
| 6,449,130 | B1 | | 9/2002 | Koyama |
| 6,628,469 | B1 | | 9/2003 | Hoyt |
| 7,475,409 | B2 | | 1/2009 | Yamagami et al. |
| 7,596,060 | B2 | | 9/2009 | Li |
| 7,760,463 | B2 | | 7/2010 | Ward et al. |
| 8,028,311 | B2 | | 9/2011 | Gilovich |
| 8,112,580 | B2 | | 2/2012 | Bandic et al. |
| 2006/0044663 | A1 | | 3/2006 | Stiles et al. |
| 2009/0067086 | A1 | | 3/2009 | Kaneko et al. |
| 2011/0122528 | A1 | | 5/2011 | Burness |

FOREIGN PATENT DOCUMENTS

| | | |
|---|---|---|
| EP | 0671741 A2 | 9/1995 |
| EP | 0895237 A1 | 2/1999 |

OTHER PUBLICATIONS

Andrew, Kane, "Unusual Disk Optimization Techniques", University of Waterloo, Oct. 28, 2009, 33 pp., URL: https://cs.uwaterloo.ca/~arkane/Presentation%20-%20Unusual%20Disk%20Optimization%20Techniques.pdf.
Seiichi Sugaya, "Trends in Enterprise Hard Disk Drives", Fujitsu Sci. Tech. J., Jan. 2006, pp. 61-71, vol. 42, Issue 1.
"Toshiba rises above competition with world's lightest notebook PC", downloaded from: https://www.toshiba.eu/innovation/jsp/news.do?service=EU&year=NONE&ID=PORTEGE_R500_NEWS_RELEASE_0 607 on May 28, 2014.

* cited by examiner

*Primary Examiner* — Mark Blouin
(74) *Attorney, Agent, or Firm* — John D. Henkhaus

(57) ABSTRACT

A lower cost per unit of storage hard disk drive (HDD) includes multiple disk stacks and a single head stack assembly for accessing the magnetic-recording disks of each of the multiple disk stacks asynchronously.

12 Claims, 3 Drawing Sheets

MULTIPLE DISK STACK, SINGLE ACTUATOR HARD DISK DRIVE

FIELD OF THE INVENTION

Embodiments of the invention relate generally to hard disk drive (HDD) storage devices and more particularly to lowering the cost per unit of storage capacity.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

While increasing areal density, a measure of the quantity of information bits that can be stored on a given area of disk surface, is one of the ever-present holy grails of HDD design evolution, the cost per unit of storage is also an ever-present constraint associated with HDD development. The cost per storage capacity, or price per capacity from a consumer's standpoint, is especially important in large data storage scenarios, such as with archival and backup storage in which large amounts of data are stored but infrequently accessed.

SUMMARY OF EMBODIMENTS OF THE INVENTION

Embodiments of the invention are directed to a hard disk drive (HDD) having multiple disk stacks and a single head stack assembly for accessing portions of one or more magnetic-recording disk of each of the multiple disk stacks. Thus, a lower cost HDD design is described which can be manufactured to have a lower cost per unit of storage.

Embodiments include a head stack assembly having a single actuator configured for accessing every disk of each of the multiple disk stacks asynchronously. In a four-disk-stack embodiment, each disk stack may be configured to rotate in both directions and the actuator may be configured with a stroke of approximately 270 degrees for accessing all four of the disk stacks.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Described herein are approaches to a hard disk drive (HDD) having multiple disk stack assemblies that are serviced by a single head stack assembly (HSA). In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
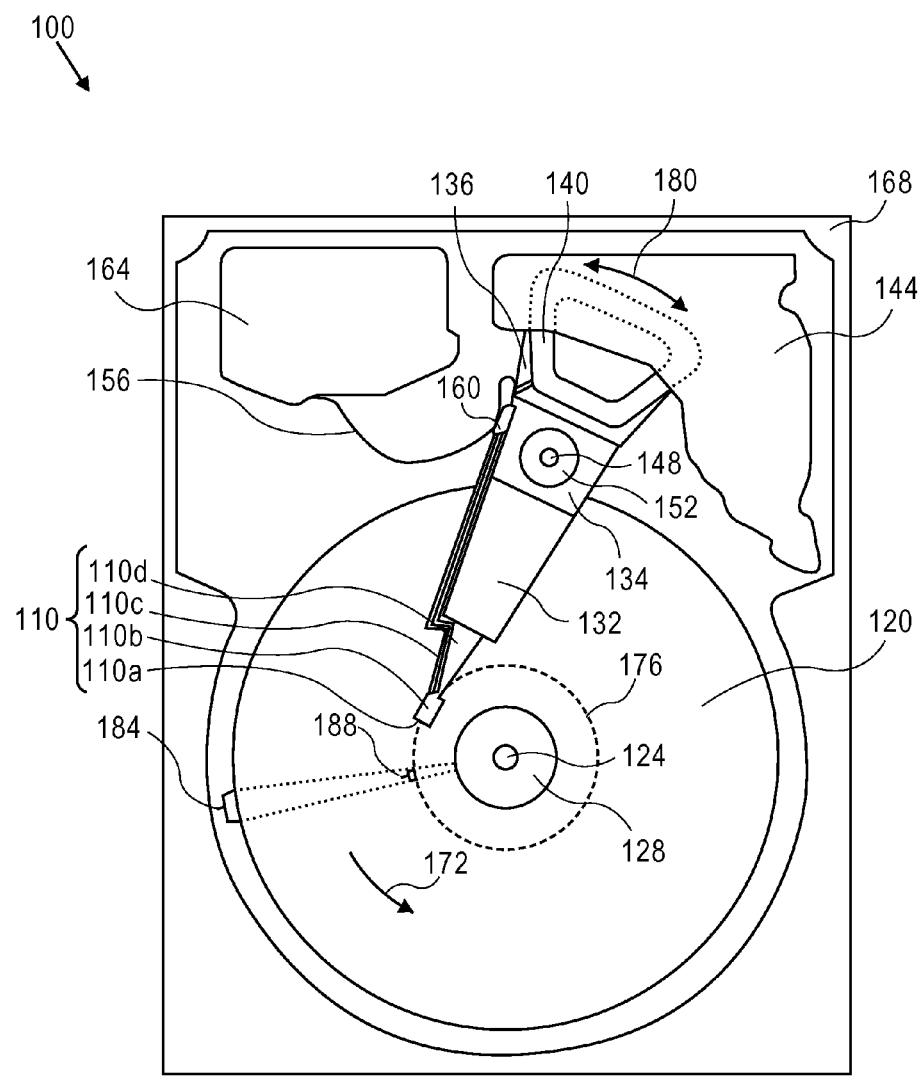
FIG. 1 is a plan view of a conventional hard disk drive (HDD)

Embodiments of the invention relate to a hard-disk drive (HDD). In accordance with an embodiment of the invention, a plan view illustrating a conventional HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110*a*, are provided by a flexible interconnect cable 156 ("flex cable"). Interconnection between the flex cable 156 and the head 110*a* may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components (not visible), including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110*b* rides so that the slider 110*b* flies above the surface of the media 120 without making contact with a thin magnetic-recording medium in which information is recorded.

The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

Introduction

The cost per unit of storage, or price per storage capacity from a consumer's standpoint, is especially important in large data storage scenarios (also referred to as "Big Data"), such as with archival and backup storage in which large amounts of data are stored but infrequently accessed (also referred to as "cold storage"). Some example approaches to lowering the cost per unit of storage are to use larger diameter disks, more disks per disk stack, and the "elevator drive" with a head stack assembly moving vertically to service a large stack of disks.

Two-Disk-Stack, Single Actuator Embodiment

One approach to lowering the cost per unit of storage is to increase the share of the total cost that the media represents, effectively amortizing cost contributors such as the read/write heads, electronics, and the like, over more media capacity and thus more overall storage capacity.

Figure 2:
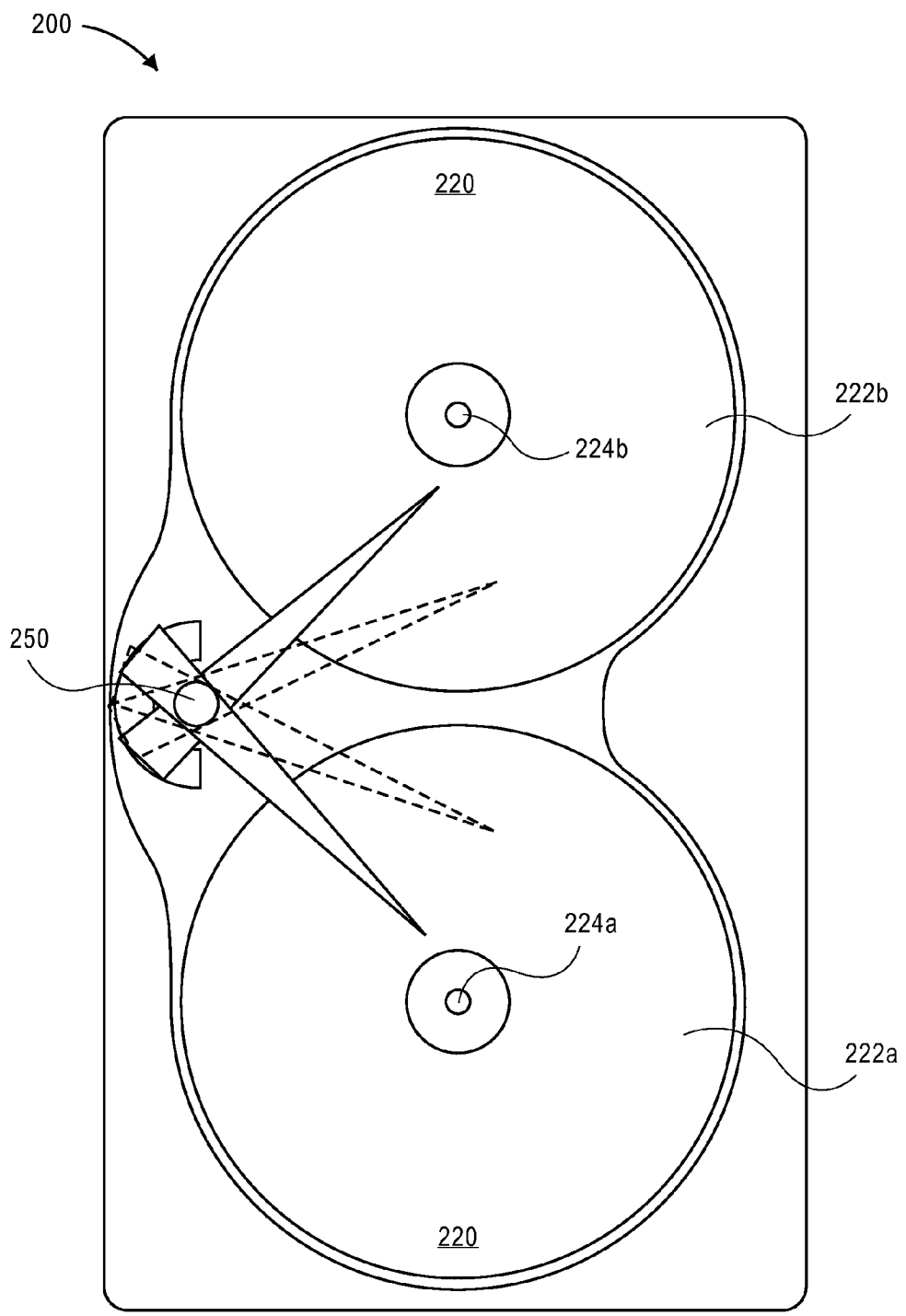
FIG. 2 is a plan view of a two-disk-stack, single actuator HDD, according to an embodiment of the invention.

FIG. 2 is a plan view of a two-disk-stack, single actuator HDD, according to an embodiment of the invention. With the exclusion of components and/or assemblies discussed hereafter, the internal components of HDD 200 are similar to or the same as like components of HDD 100 (FIG. 1). Thus, for the purposes of clarity and simplicity, such like components are not necessarily depicted in FIG. 2 or described again in reference to FIG. 2. Reference is made to FIG. 1 and the corresponding description for the showing and description of the components of HDD 200 that are like components of HDD 100.

One difference between HDD 200 and HDD 100 (FIG. 1) is that HDD 200 comprises two disk stacks, i.e., disk stack 222*a* and disk stack 222*b*, rather than the typical single disk stack. Each of disk stack 222*a* and 222*b* comprises one or more disk 220. Preferably but not by way of limitation, each disk stack 222*a* and 222*b* would comprise multiple disks, such as ten disks 220 per disk stack 222*a*, 222*b*, to provide for a large storage capacity HDD. The one or more disk 220 of each disk stack 222*a*, 222*b* are coupled to and rotated by respective spindles, i.e., spindle 224*a* and spindle 224*b*.

According to an embodiment, spindle 224*a* rotates disk stack 222*a* in one direction while spindle 224*b* rotates disk stack 222*b* in the opposite direction. For example, disk stack 222*a* may rotate in a clockwise direction 225*a* while disk stack 222*b* may rotate in a counter-clockwise direction 225*b*. Thus, with the capability to rotate in opposite directions the disk(s) 220 can generate airflow in both rotational directions so that the head slider is able to maintain its flying angle of attack relative to the rotational airflow over the disk(s) 220 corresponding to each disk stack 222*a*, 222*b*. Disk stack 222*a* and disk stack 222*b* may rotate simultaneously or may rotate asynchronously. According to an alternative embodiment, each spindle 224*a*, 224*b* rotates its respective disk stack 222*a*, 222*b* in the same direction and the head slider is appropriately positioned over the disk(s) 220 of each disk stack 222*a*, 222*b* for read and write operations.

However, and notably, HDD 200 comprises a single head stack assembly (HSA) 250 to service the disks 220 of both disk stack 222*a* and disk stack 222*b*. HSA 250 comprises similar components as shown and described in reference to FIG. 1, such as armature 136, voice coil 140 or another type of rotational actuating device, pivot-shaft 148, pivot-bearing assembly 152, carriage 134, arm 132, head gimbal assembly (HGA) 110, arm-electronics (AE) module 160, and flexible interconnect cable 156. The rotational stroke of HSA 250 is greater than is typical with a conventional HDD voice coil actuator, such as with HDD 100 (FIG. 1), in order to be able to service the two adjacent disk stacks 222*a*, 222*b*. According to an embodiment, the actuator portion of HSA 250 is configured to move the head slider in an arc of approximately 90 degrees, to reach all the data tracks of disks 220 of both disk stack 222*a* and disk stack 222*b*.

Furthermore, the configuration of the two-disk-stack, single actuator HDD 200 is such that the single HSA 250 comprises a single actuator configured to move the head slider to access each of disk stack 222a and disk stack 222b asynchronously, i.e., one disk stack at a time, rather than simultaneously.

Four-Disk-Stack, Single Actuator Embodiment

Figure 3:
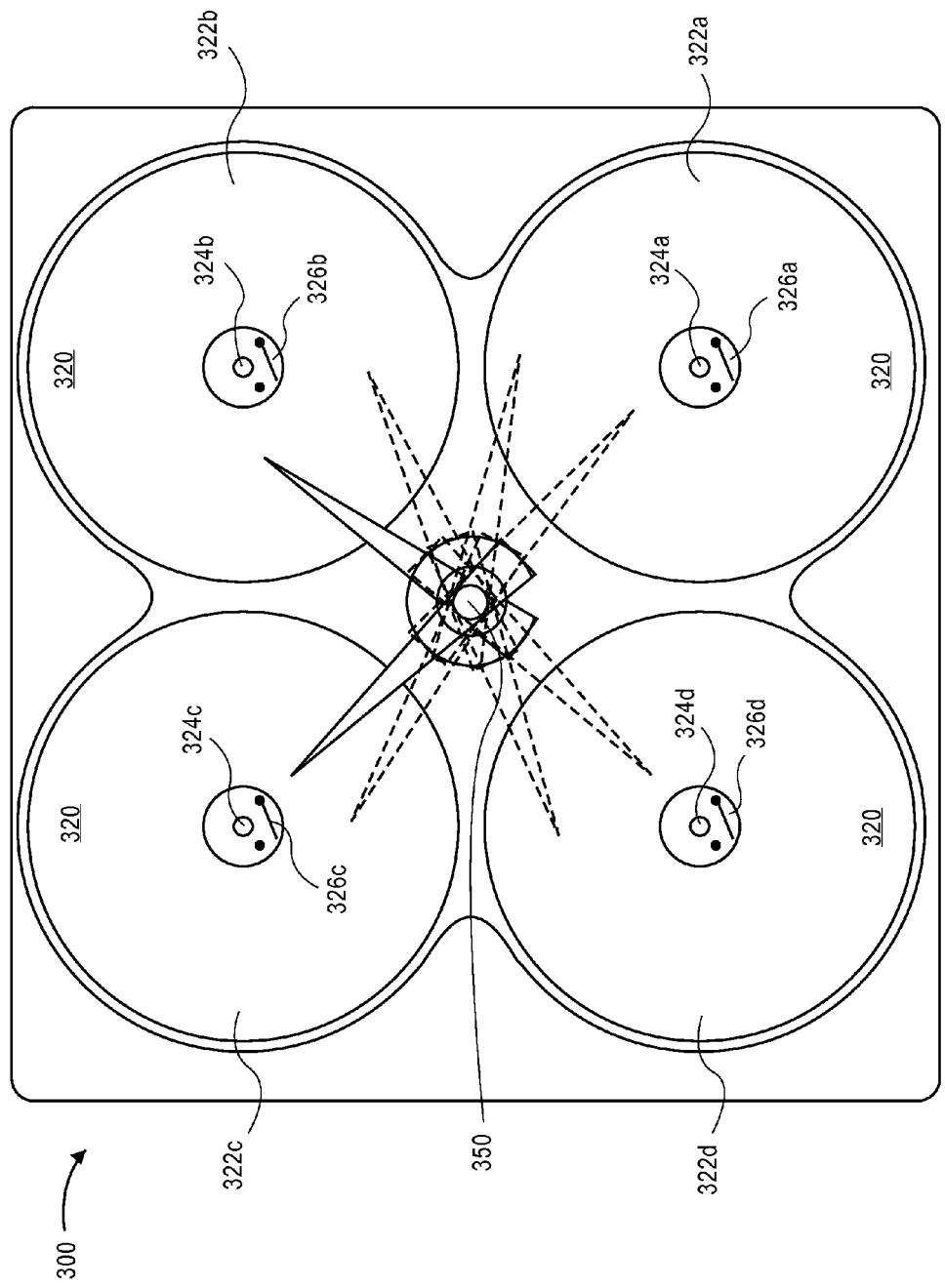
FIG. 3 is a plan view of a four-disk-stack, single actuator HDD, according to an embodiment of the invention.

FIG. 3 is a plan view of a four-disk-stack, single actuator HDD, according to an embodiment of the invention. With the exclusion of components and/or assemblies discussed hereafter, the internal components of HDD 300 are similar to or the same as like components of HDD 100 (FIG. 1). Thus, for the purposes of clarity and simplicity, such like components are not necessarily depicted in FIG. 3 or described again in reference to FIG. 3. Reference is made to FIG. 1 and the corresponding description for the showing and description of the components of HDD 300 that are like components of HDD 100.

One difference between HDD 300 and HDD 100 (FIG. 1) is that HDD 300 comprises four disk stacks, i.e., disk stack 322a, disk stack 322b, disk stack 322c and disk stack 322d, rather than the typical single disk stack. Each of disk stack 322a, 322b, 322c, 322d comprises one or more disk 320. Preferably but not by way of limitation, each disk stack 322a, 322b, 322c, 322d would comprise multiple disks, such as ten disks 320 per disk stack 322a, 322b, 322c, 322d, to provide for a large storage capacity HDD. The one or more disk 320 of each disk stack 322a, 322b, 322c, 322d is coupled to and rotated by a respective spindle, i.e., spindle 324a, spindle 324b, spindle 324c and spindle 324d. The respective disk stacks 322a, 322b, 322c, 322d may be configured to rotate simultaneously or asynchronously.

Notably, HDD 300 comprises a single head stack assembly (HSA) 350 to service the disk(s) 320 of every disk stack 322a, 322b, 322c, 322d. HSA 350 comprises similar components as shown and described in reference to FIG. 1, such as armature 136, voice coil 140 or another type of rotational actuating device, pivot-shaft 148, pivot-bearing assembly 152, carriage 134, arm 132, head gimbal assembly (HGA) 110, arm-electronics (AE) module 160, and flexible interconnect cable 156. The rotational stroke of HSA 350 is greater than is typical with a conventional HDD voice coil actuator, such as with HDD 100 (FIG. 1), in order to be able to service each of the four adjacent disk stacks 322a, 322b, 322c, 322d. According to an embodiment, the actuator portion of HSA 350 is configured to move the head slider in an arc of approximately 270 degrees, to reach all the data tracks of disk(s) 320 of each disk stack 322a, 322b, 322c, 322d.

Furthermore, the configuration of the four-disk-stack, single actuator HDD 300 is such that the single HSA 350 comprises a single actuator configured to move the head slider to access each of disk stack 322a, 322b, 322c, 322d asynchronously, i.e., one disk stack at a time, rather than simultaneously.

According to an embodiment, each disk stack 322a, 322b, 322c, 322d is rotatable by their respective spindle 324a, 324b, 324c, 324d, in both clockwise and counter-clockwise directions. Such operational functionality allows for a single slider air bearing surface (ABS) design for flying the head slider over areas of the disks on both sides of the respective spindle. Therefore, for example, when HSA 350 is operating to fly the head slider over the generally right side of disk(s) 320 of disk stack 322b, spindle 324b is rotating the disk(s) 320 in a counter-clockwise direction. Similarly, and continuing with the example, when the head slider is flying over the generally left side of disk(s) 320 of disk stack 322b, spindle 324b is rotating the disk(s) 320 in a clockwise direction. Consequently, the head slider can maintain its flying angle of attack relative to the rotating disk 320 surface regardless of which portion of the disk 320 the head slider is currently flying over. That is, with the capability to rotate in both directions the disk(s) 320 can generate airflow in both rotational directions so that the head slider is able to maintain its flying angle of attack relative to the rotational airflow over all areas of the disk(s) 320.

Another approach to the challenge posed by the head slider flying or crossing over quadrants of the disk(s) 320 on both sides of the respective spindle 324a, 324b, 324c, 324d, and according to an embodiment, is to utilize a spindle switch 326a, 326b, 326c, 326d corresponding to each respective disk stack 322a, 322b, 322c, 322d. Each spindle switch 326a, 326b, 326c, 326d is configured to start and stop the rotating of the spindle 324a, 324b, 324c, 324d associated with its respective disk stack. In FIG. 3, for the purpose of simplicity the spindle switches 326a, 326b, 326c, 326d are shown positioned near the respective spindles 324a, 324b, 324c, 324d. However, spindle switches 326a, 326b, 326c, 326d may be positioned in locations remote from the spindles 324a, 324b, 324c, 324d, such as on an electronics card or in circuitry corresponding to the spindle motor driver logic.

According to an embodiment, each spindle switch 326a, 326b, 326c, 326d is configured to stop the rotating of the respective spindle when the head slider is moving from the respective disk stack to another disk stack. For example, when HSA 350 is operating to fly the head slider over the generally right side of disk(s) 320 of disk stack 322b, spindle 324b is rotating the disk(s) 320 in a counter-clockwise direction. Continuing with the example, when HSA 350 is operating to move the head slider over the generally left side of disk(s) 320 of disk stack 322b, such as to move the head slider to access the generally right side of disk(s) 320 of disk stack 322c, rather than the spindle 324b rotating the disk(s) 320 in a counter-clockwise direction as in the foregoing embodiment, spindle switch 326b is utilized to stop the rotation of spindle 324b and disk(s) 320 of disk stack 322b. Consequently, the head slider does not encounter a situation of flying with an angle of attack that is functionally opposing the air flow that would otherwise be created by the rotation of disk(s) 320 were they still rotating counter-clockwise.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A hard disk drive, comprising:
a plurality of disk stacks, each disk stack comprising one or more magnetic-recording disk rotatably mounted on a spindle; and only one head stack assembly, comprising:
- only one stack of one or more head slider comprising a magnetic read/write head for reading data from and writing data to one or more magnetic-recording disk,
- only one stack of one or more flexure, to which each respective one or more head slider is coupled,
- only one stack of one or more actuator arm, to which each respective one or more flexure is coupled, and
- an actuator, to which said stack of one or more actuator arm is coupled, said actuator configured to move said one or more head slider to access portions of said one or more magnetic-recording disk of each of the plurality of disk stacks.

2. The hard disk drive of claim 1, wherein said one head stack assembly comprises a single actuator configured to move said head slider to access said portions of every magnetic-recording disk of each of the plurality of disk stacks, and wherein each of the plurality of disk stacks is positioned for asynchronous access.

3. The hard disk drive of claim 1,
wherein said actuator is configured to move said head slider in an arc of at least approximately 90 degrees.

4. The hard disk drive of claim 1,
said plurality of disk stacks consisting of two disk stacks.

5. The hard disk drive of claim 1,
said plurality of disk stacks consisting of four disk stacks.

6. The hard disk drive of claim 5,
wherein said actuator is configured to move said head slider in an arc of at least approximately 270 degrees.

7. The hard disk drive of claim 5, comprising:
a spindle switch corresponding to each respective disk stack, said spindle switch configured to stop the rotating of said spindle associated with said respective disk stack when said head slider is moving from said respective disk stack to another disk stack.

8. The hard disk drive of claim 5,
wherein said spindle of at least one of said four disk stacks rotates in both a clockwise direction and a counter-clockwise direction.

9. A hard disk drive, comprising:
two disk stacks, each disk stack comprising a plurality of magnetic-recording disks rotatably mounted on a spindle, wherein said spindle of a first disk stack rotates in a clockwise direction and said spindle of a second disk stack rotates in a counter-clockwise direction; and
a single head stack assembly, comprising:
- a head slider comprising a magnetic read/write head for reading data from and writing data to said magnetic-recording disks, and
- an actuator configured to move said head slider to access portions of said plurality of magnetic-recording disks of each of said two disk stacks and wherein each of the two disk stacks is positioned for asynchronous access.

10. The hard disk drive of claim 9, wherein said single head stack assembly comprises a single voice coil actuator configured to move said head slider to access said portions of said plurality of magnetic-recording disks of both of the two disk stacks.

11. A hard disk drive, comprising:
four disk stacks, each disk stack comprising a plurality of magnetic-recording disks rotatably mounted on a spindle;
a single head stack assembly, comprising:
- a head slider comprising a magnetic read/write head for reading data from and writing data to said magnetic-recording disks, and
- an actuator configured to move said head slider in an arc of approximately 270 degrees to access portions of said plurality of magnetic-recording disks of each of said four disk stacks and wherein each of the four disk stacks is positioned for asynchronous access; and
wherein said spindle of at least one of said four disk stacks rotates in both a clockwise direction and a counter-clockwise direction.

12. The hard disk drive of claim 11, wherein said single head stack assembly comprises a single voice coil actuator configured to move said head slider to access said portions of said plurality of magnetic-recording disks of all four of the disk stacks.

* * * * *